(12) United States Patent
Taylor et al.

(10) Patent No.: US 8,561,106 B1
(45) Date of Patent: Oct. 15, 2013

(54) VIDEO ADVERTISEMENT PLACEMENT

(75) Inventors: Karen Padham Taylor, Los Gatos, CA (US); Manish Gupta, Santa Clara, CA (US); Steve Okamoto, San Jose, CA (US); Tammy McLeod, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 466 days.

(21) Appl. No.: 11/963,180

(22) Filed: Dec. 21, 2007

(51) Int. Cl.
*H04N 5/445* (2011.01)
(52) U.S. Cl.
USPC ............................................. 725/41; 725/32
(58) Field of Classification Search
USPC ......................................... 725/42, 43, 32, 41
See application file for complete search history.

(56) References Cited

U.S. PATENT DOCUMENTS

| 2002/0136293 | A1* | 9/2002 | Washino | 375/240.01 |
| 2005/0019015 | A1* | 1/2005 | Ackley et al. | 386/95 |
| 2005/0240596 | A1* | 10/2005 | Worthen et al. | 707/10 |
| 2006/0064716 | A1* | 3/2006 | Sull et al. | 725/37 |
| 2008/0109844 | A1* | 5/2008 | Baldeschwieler et al. | 725/35 |

* cited by examiner

*Primary Examiner* — Nasser Goodarzi
*Assistant Examiner* — Hyun Hong
(74) *Attorney, Agent, or Firm* — Fish & Richardson P.C.

(57) ABSTRACT

A content item location is identified on a content page. A content item and a video associated with the content item to display in the content item location are also identified, wherein the video is defined by a video aspect ratio and is associated with a video element, and further wherein the video element is defined by a video element aspect ratio. Display data is generated for displaying the content item in the content item location, and video selection data is generated for displaying the video element in the content item location, wherein the video element aspect ratio is maintained when the video element is displayed. The display data and the video selection data are provided.

24 Claims, 4 Drawing Sheets

VIDEO ADVERTISEMENT PLACEMENT

BACKGROUND

This disclosure relates to information retrieval.

Interactive media (e.g., the Internet) has great potential for improving the targeting of content items, e.g., advertisements, to receptive audiences. One form of online advertising is ad syndication, which allows advertisers to extend their marketing reach by distributing ads to additional partners. For example, third party online publishers can place an advertiser's text or image ads on the publishers' web pages to drive online customers to the advertiser's web page.

The advertisements that are placed on a publisher's web page may have to be displayed in an advertisement block that is a predetermined size. Often, the advertisements are associated with images and videos that may have to be resized before being displayed in the advertisement blocks. Resizing images and videos, however, can stretch the image or video out of proportion.

SUMMARY

Disclosed herein are systems, apparatus, computer program products and methods for displaying advertisements. In an implementation a content item location is identified on a content page. A content item and a video associated with the content item to display in the content item location are also identified, wherein the video is defined by a video aspect ratio and is associated with a video element, and further wherein the video element is defined by a video element aspect ratio. Display data is generated for displaying the content item in the content item location, and video selection data is generated for displaying the video element in the content item location, wherein the video element aspect ratio is maintained when the video element is displayed. The display data and the video selection data are provided.

In another implementation, an identification of an advertisement block on a content page is received, wherein the advertisement block is associated with a predetermined size. A content item image associated with an advertisement is received and displayed in the advertisement block, wherein the advertisement is associated with a video, and further wherein the video is associated with a video element. The video element is received and displayed in the advertisement block, wherein an aspect ratio of the video element is maintained when the video element is displayed.

These various optional advantages and features can be separately realized and need not present in any particular embodiment. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
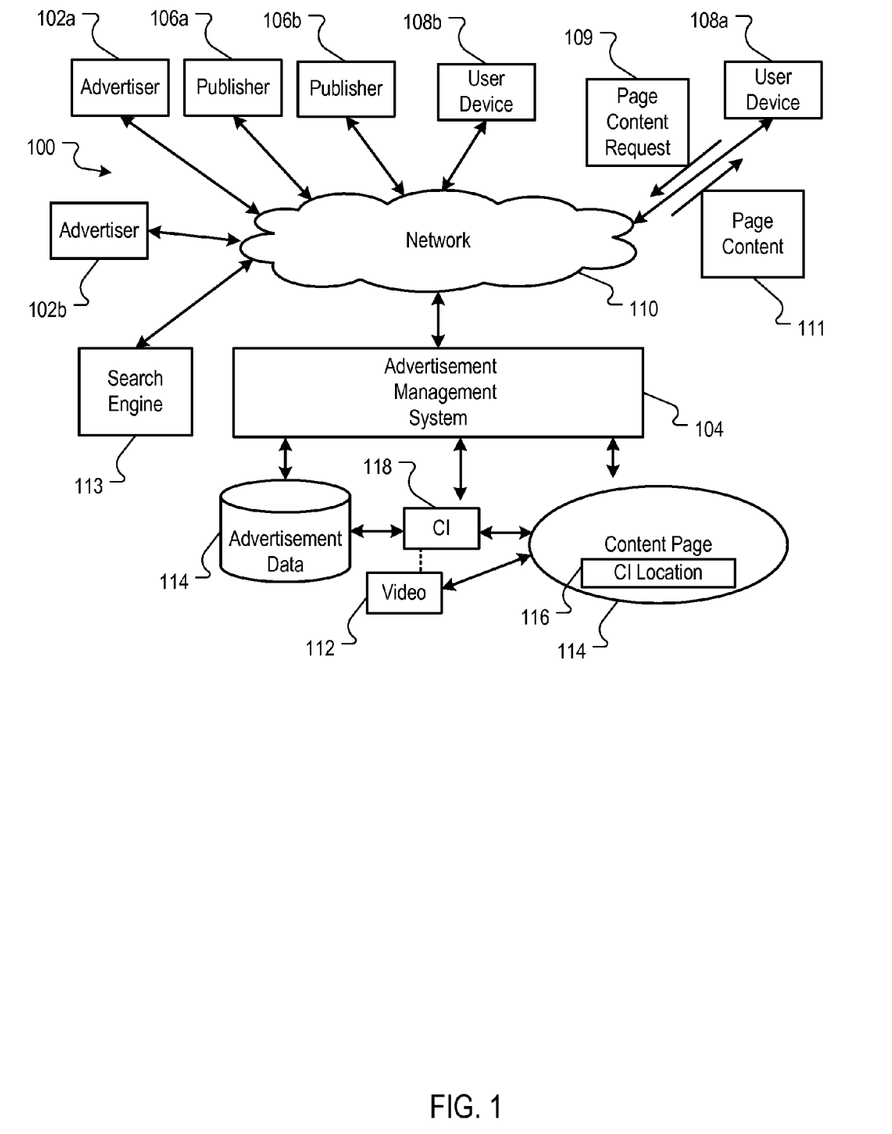
FIG. 1 is a block diagram of an example online environment.

FIG. 1 is a block diagram of an example online environment 100. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102*a* and 102*b*, an advertisement management system 104, publishers 106*a* and 106*b*, user devices 108*a* and 108*b*, and a search engine 113. Although only two advertisers (102*a* and 102*b*), two publishers (106*a* and 106*b*) and two user devices (108*a* and 108*b*) are shown, the online environment 100 may include many (e.g., thousands) advertisers, publishers and user devices. While reference is made to delivering advertisements, other forms of content including other forms of sponsored content can be delivered. Further, while reference is made to an example system that delivers content over the web, other media delivery systems including audio, video, broadcast, satellite, cable, print, etc., and other forms of media may be used.

In some implementations, one or more advertisers 102*a* and/or 102*b* can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisements combining one of more of any of such components, etc., or any other type of electronic advertisement document. The advertisements may also include embedded information, such as a links, meta-information, and/or machine executable instructions, such as HTML or JavaScript™.

A user device, such as user device 108*a*, can submit a page content request 109 to a publisher or the search engine 113. In some implementations, the page content 111 can be provided to the user device 108*a* in response to the page content request 109. The page content can include advertisements provided by the advertisement management system 104, or can include executable instructions, e.g., JavaScript™ instructions, that can be executed at the user device 108*a* to request advertisements from the advertisement management system 104. Example user devices 108 include personal computers, mobile communication devices, television set-top boxes, etc.

Advertisements can also be provided from the publishers 106. For example, one or more publishers 106*a* and/or 106*b* can submit advertisement requests for one or more advertisements to the system 104. The system 104 responds by sending the advertisements to the requesting publisher 106*a* or 106*b* for placement on one or more of the publisher's web properties (e.g., websites and other network-distributed content). The advertisements can include embedded links to landing pages, e.g., pages on the advertisers' 102 websites that a user is directed to when the user clicks an ad presented on a publisher website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the system 104. This combined page content 111 and advertisements can be sent to the user device 108 that requested the content (e.g., user device 108a) as page content 111 for presentation in a viewer (e.g., a web browser or other content display system). The publisher 106 can transmit information about the advertisements back to the advertisement management system 104, including information describing how, when, and/or where the advertisements are to be rendered (e.g., in HTML or JavaScript™).

Publishers 106a and 106b can include general content servers that receive requests for content (e.g., articles, discussion threads, music, video, graphics, search results, web page listings, information feeds, etc.), and retrieve the requested content in response to the request. For example, content servers related to news content providers, retailers, independent blogs, social network sites, or any other entity that provides content over the network 110 can be a publisher.

Advertisements can also be provided through the use of the search engine 113. The search engine 113 can receive queries for search results. In response, the search engine 113 can retrieve relevant search results from an index of documents (e.g., from an index of web pages). An exemplary search engine 113 is described in S. Brin and L. Page, "The Anatomy of a Large-Scale Hypertextual Search Engine," Seventh International World Wide Web Conference, Brisbane, Australia (1998) and in U.S. Pat. No. 6,285,999. Search results can include, for example, lists of web page titles, snippets of text extracted from those web pages, and hypertext links to those web pages, and may be grouped into a predetermined number of (e.g., ten) search results.

The search engine 113 can also submit a request for advertisements to the system 104. The request may include a number of advertisements desired. This number may depend on the search results, the amount of screen or page space occupied by the search results, the size and shape of the advertisements, etc. The request for advertisements may also include the query (as entered, parsed, or expanded), information based on the query (such as geo-location information, whether the query came from an affiliate and an identifier of such an affiliate), and/or information associated with, or based on, the search results. Such information may include, for example, identifiers related to the search results (e.g., document identifiers), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search engine 113 can combine the search results with one or more of the advertisements provided by the system 104. This combined information can then be forwarded to the user device 108 that requested the content as the page content 111. The search results can be maintained as distinct from the advertisements, so as not to confuse the user between paid advertisements and search results.

In some implementations, the advertisement system 104 may serve advertisements that include videos associated with the advertisements. Videos associated with an advertisement may be displayed on the user device 108 when the associated advertisement is displayed. In some implementations, the user device 108 may include interaction mechanisms to control when such videos are displayed.

In some implementations, the serving of the advertisements can be further optimized by placing the advertisement and the video in a content item location block on the content page while maintaining an aspect ratio associated with the video when the video is displayed. In addition to providing the advertisement and the videos associated with the advertisement, the advertisement management system 104 can also verify the aspect ratio of the video is maintained when the advertisement and the video are placed on the content page.

In some implementations, the management system 104 can identify a content item location 116 on a content page 114 The content item location 116 can, for example, include a location on the content page 114 to place a content item 118, e.g., an advertisement. The content item location 116 can, for example, include an advertisement location block on a publisher's webpage. The content item location 116 can include one of a number of predetermined content item location sizes.

In some implementations, the content item location 116 can be in different formats. The formats can, for example, include a leaderboard format, a banner format, a skyscraper format, and a wide skyscraper format. Each format can have a predetermined height and weight. For example, a leaderboard format can include a location on the content page 114 that measures 728 pixels by 90 pixels. A skyscraper format can include a location on the content page 114 that measures 120 pixels by 600 pixels. A wide skyscraper format can include a location on the content page 114 that measures 160 pixels by 600 pixels.

In some implementations, the advertisement management system 104 can identify the content item 118 as well as a video 112 associated with the content item 118. The content item 118 can include an image associated with the advertisement. For example, the image can include an image of a flower if the advertisement is an advertisement for a flower shop. The content item 118 and the video 112 associated with the advertisement may be displayed on the user device when the associated advertisement is displayed.

In some implementations, the video 112 can be associated with an aspect ratio. The aspect ratio of the video 112 refers to the width of a picture or screen of the video in relation to the video's height. The aspect ratios can, for example, be expressed in the form "width×height." For example, a 4×3 ratio means the picture is 4 units wide by 3 units high. Alternatively a colon may be used (e.g. 4:, 5:4, or 9:16) or a ratio to the number 1 (e.g. 1.33:1 or 1.78:1).

In some implementations, the user device 108 may include an interaction mechanism to control the playing of the video. Such an interaction mechanism can be realized, for example, by selection data that is operable to display videos associated with the advertisement in a predetermined area, proximate to the advertisement. In this way, the user may view a particular advertisement. The advertisement can, for example, be in the form of an advertisement for an online retailer that sells flowers, in which the advertisement includes text, graphics, audio and/or video associated with the flowers. The user can decide whether to play the video associated with the advertisement.

In some implementations, the user is presented with a "play button" video element within or proximate to the advertisement. For example, a play button can be shown after the advertisement has been displayed. In other implementation, other video elements can be presented to the user. For example, the video element can include a video still image. If the user selects (e.g., clicks on) the video element, the user can see the relevant video for the corresponding advertisement. In some implementations, the video element is associated with an aspect ratio. The aspect ratio, as described above, refers to the width and height ratio of the video element.

In some implementations, the advertisement management system 104 can generate display data for displaying the content item 118 in the content item location 116. The system 104 can, for example, display the image associated with the advertisement in the content item location 116. In some implementations, the system 104 can adjust the content item 118 to fit the content item location 116. For example, if the content item 118 is an image, the system 104 can crop the image in order for the image to fit the content item location 116. The system 104 can, for example, also reduce a size of the image to fit the content item location 116. The image can be cropped or reduced in order for the image to occupy no more space than the content item location 116 allows.

In some implementations, the advertisement management system 104 can generate video selection data for displaying the video element, e.g., play button or video still image, in the content item location 116. The system 104 can, for example, display the video element at one end of the content item location 116, for example, at the very top or at the very right side of the content item location 116.

In some implementations, the advertisement management system 104 can display the video element such that the aspect ratio of the video element is maintained when the video 112 is displayed. The video element can, for example, be displayed such that the aspect ratio of the video element does not change. Maintaining the aspect ratio ensures that the video element does not stretch out of proportion.

For example, if the aspect ratio of the video element before it is displayed is 4:3, the aspect ratio of 4:3 is maintained when the video element is displayed in the content item location 116. Therefore, if the video element is adjusted prior to being placed in the content item location 116, the adjusting is done while maintaining the aspect ratio. For example, if a video element has an aspect ratio of 2:1, this means that the width is twice as large as the height. When resizing the video element in order to place the video element in the content item location 116, the aspect ratio of 2:1 is maintained to avoid stretching the graphic out of proportion.

In some implementations, the video 112 starts to play upon selection of the video element at the user device 108. For example, if the video element is a play button, if a user selects the play button, the video 112 starts to play. In some implementations, the aspect ratio of the of the video 112 is maintained when the video is played. Therefore, even if the video 112 is resized, the aspect ratio is maintained.

Figure 2:
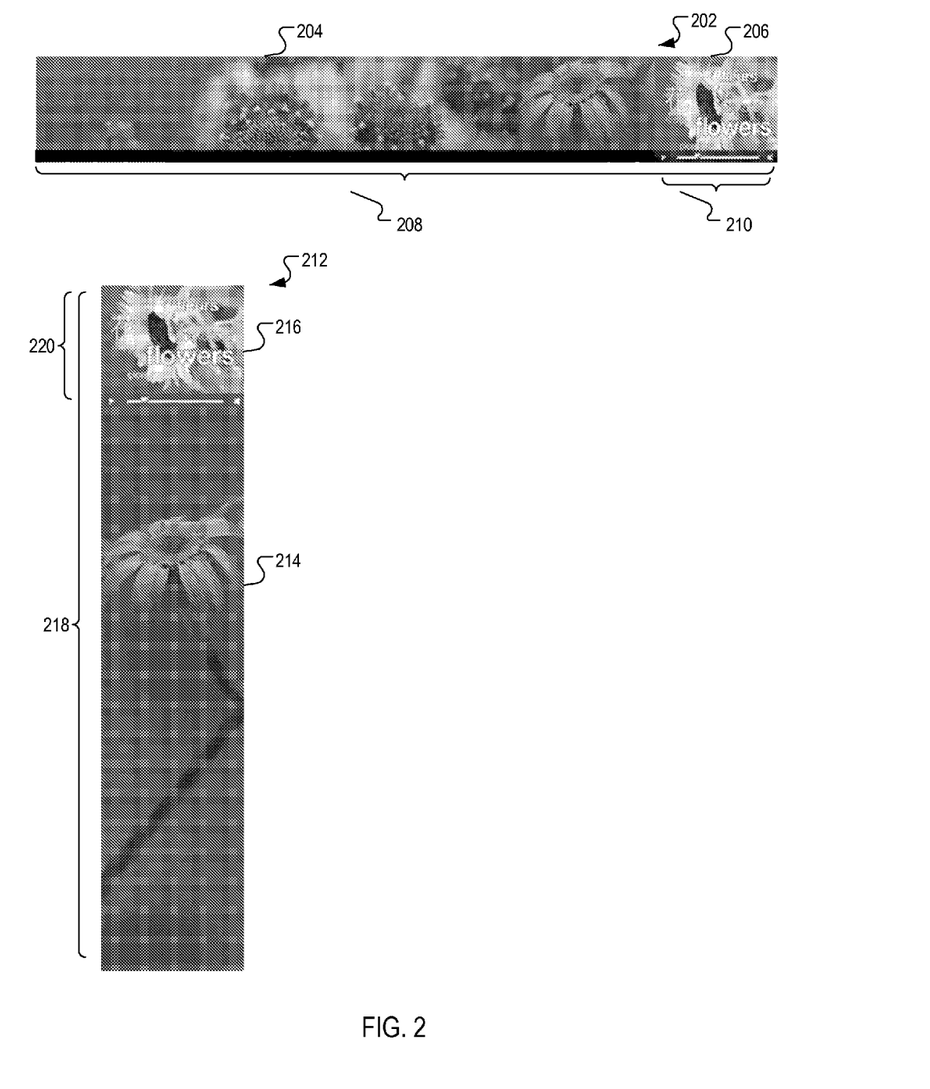
FIG. 2 is a screen shot of advertisements in advertisement blocks.

FIG. 2 is an example screen shot 202 that includes two advertisements that have been placed in two content item locations. Advertisement 202 is an advertisement for a flower shop that includes an image 204 and a video element 206. For example, the advertisement 202 may be displayed in a browser on a client device 108, such as a smart phone, a personal computer, a personal digital assistant (PDA), or some other wired or wireless electronic device. The image 204 is an image of flowers and the video element 206 is a video still image of the video associated with the advertisement 202.

The advertisement 202 is displayed in the content item location 208 such that the aspect ratio 210 of the video element 206 is maintained. In this example, the content item location 208 is a leaderboard format. The video element 206 is placed on the far right of the leaderboard, while maintaining the aspect ratio 210. Therefore, if the video element 206 has to be resized prior to placing the video element 206 in the content item location 208, the resizing is done to ensure the aspect ratio 210 was maintained so that the video element is not stretched out of proportion. The image 204 occupies the rest of the content item location 208.

Advertisement 212 is another advertisement for a flower shop that includes an image 214 and a video element 216. The image 214 is an image of flowers and the video element 216 is a video still image of the video associated with the advertisement 212. The advertisement 212 is also displayed in the content item location 218 such that the aspect ratio 220 of the video element 216 is maintained. In this example, the content item location 218 is a skyscraper format. The video element 216 is placed on the top of the skyscraper, while maintaining the aspect ratio 220. Again, if the video element 216 had to be resized prior to placing the video element 216 in the content item location 218, the resizing was done to ensure the aspect ratio 220 was maintained so that the video element is not stretched out of proportion. The image 214 occupies the rest of the content item location 218.

In both advertisements 202 and 212, the aspect ratio of each video element, 210 and 220, respectively, are maintained. Therefore, the height and weight ratio of each video element 206 and 216 does not change. If the video elements 206 and 216 were adjusted to fit the content item locations 208 and 218, respectively, then the aspect ratios 210 and 220 are adjusted accordingly such that the aspect ratio remains unchanged.

Figure 3:
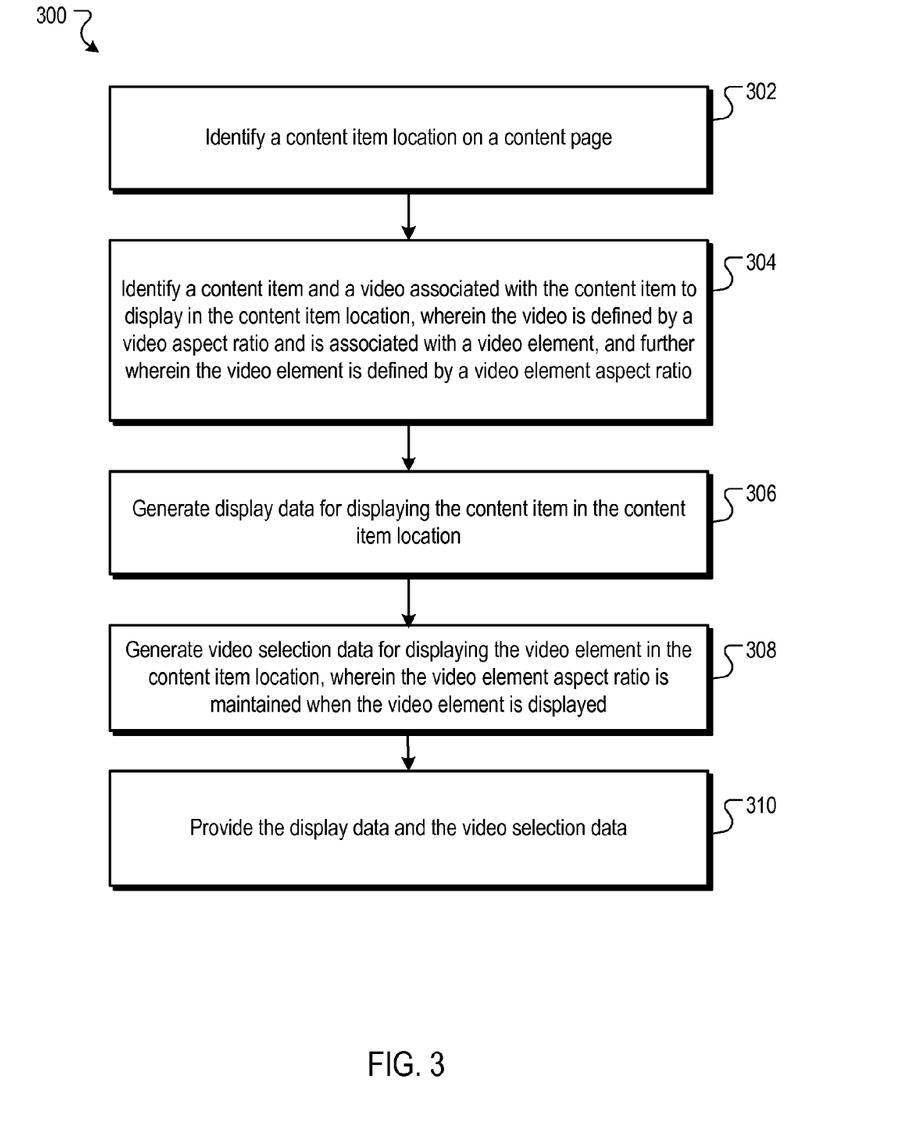
FIG. 3 is a flow diagram of an example process for displaying a content item and a video associated with the content item.

FIG. 3 is a flow diagram of an example process 300 for displaying a content item and a video associated with the content item. The process 300 can, for example, be implemented in a system such as the advertisement management system 104 of FIG. 1.

Stage 302 identifies a content item location on a content page. For example, the advertisement management system 104 can identify a content item location on a content page.

Stage 304 identifies a content item and a video associated with the content item to display in the content item location, wherein the video is defined by a video aspect ratio and is associated with a video element, and further wherein the video element is defined by a video element aspect ratio. For example, the advertisement management system 104 can identify a content item and a video associated with the content item to display in the content item location, wherein the video is defined by a video aspect ratio and is associated with a video element, and further wherein the video element is defined by a video element aspect ratio.

Stage 306 generates display data for displaying the content item in the content item location. For example, the advertisement management system 104 can generates display data for displaying the content item in the content item location.

Stage 308 generates video selection data for displaying the video element in the content item location, wherein the video element aspect ratio is maintained when the video element is displayed. For example, the advertisement management system 104 can generate video selection data for displaying the video element in the content item location, wherein the video element aspect ratio is maintained when the video element is displayed.

Stage 310 provides the display data and the video selection data. For example, the advertisement management system 104 can provide the display data and the video selection data.

Figure 4:
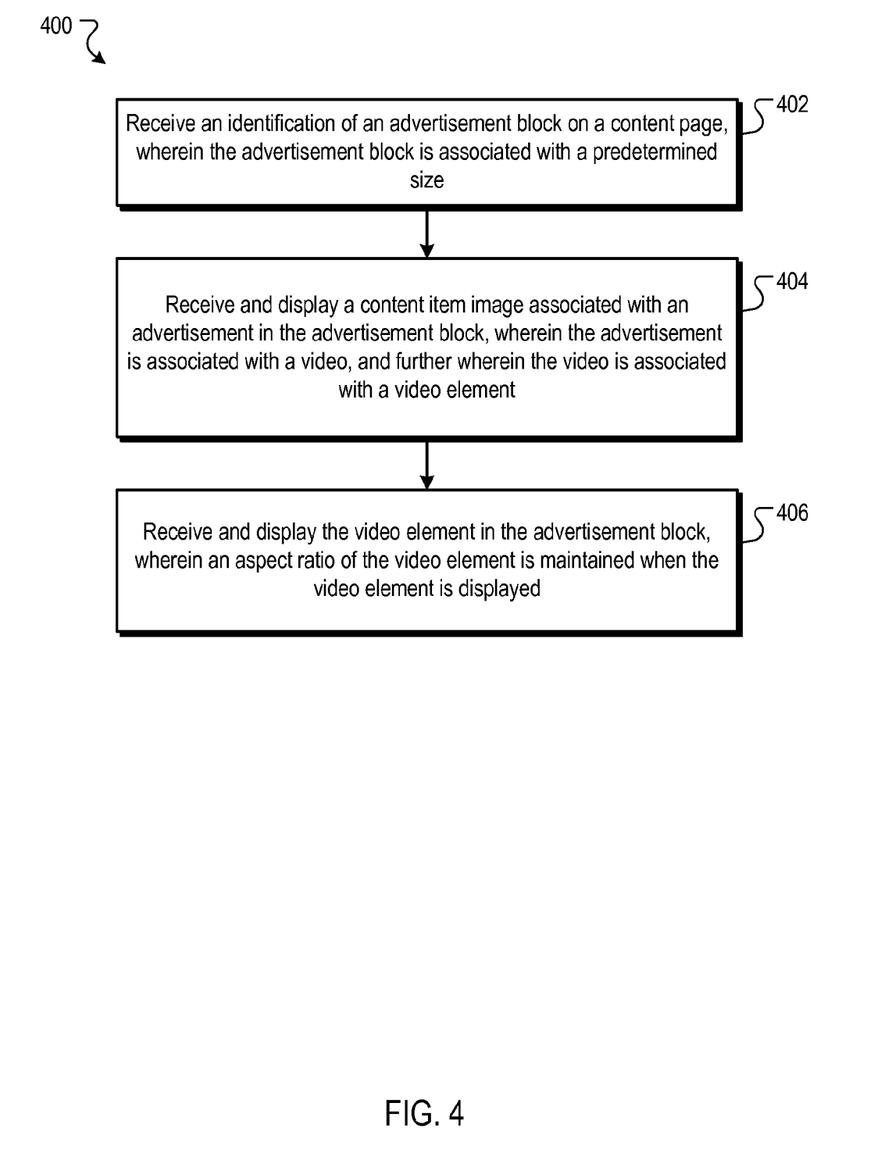
FIG. 4 is another flow diagram of an example process for displaying a content item and a video associated with the content item.

FIG. 4 is another flow diagram of an example process 400 for displaying a content item and a video associated with the content item. The process 400 can, for example, be implemented in a system such as the advertisement management system 104 of FIG. 1.

Stage 402 receives an identification of an advertisement block on a content page, wherein the advertisement block is associated with a predetermined size. For example, the advertisement management system 104 can receive an identification of an advertisement block on a content page, wherein the advertisement block is associated with a predetermined size.

Stage 404 receives and displays a content item image associated with an advertisement in the advertisement block, wherein the advertisement is associated with a video, and further wherein the video is associated with a video element. For example, the advertisement management system 104 can receive and display a content item image associated with an advertisement in the advertisement block, wherein the advertisement is associated with a video, and further wherein the video is associated with a video element.

Stage 406 receives and displays the video element in the advertisement block, wherein an aspect ratio of the video element is maintained when the video element is displayed. For example, the advertisement management system 104 can receive and display the video element in the advertisement block, wherein an aspect ratio of the video element is maintained when the video element is displayed.

The advertisement management system 104 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   identifying a content item location on a content page;
   identifying a content item and a video associated with the content item to display in the content item location, wherein:
   the video is defined by a video aspect ratio and is associated with a video element;
   the video element is defined by a video element aspect ratio that is different from the video aspect ratio and has a first dimension that is equal to a first dimension of the video, and a second dimension that is larger than a second dimension of the video;
   the video is displayed in a first portion of the video element, the first portion of the video element being of the first and second dimensions of the video; and
   a playback control for playing the video is displayed in a second portion of the video element that is adjacent to the first portion of the video element, wherein the playback control has a first dimension that is equal to the first dimension of the video element, wherein the second portion of the video element has a second dimension that is equal to a difference of the second dimension of the video and the second dimension of the video element, and wherein the second portion is contiguous to the first portion;
   generating data for displaying the content item in the content item location;
   generating data for displaying the video element proximate to the content item in the content item location, wherein the content item location has a first dimension that is equal to one of the dimensions of the video element such that the video element aspect ratio is maintained when the video element is displayed in the content item location;
   providing the data for displaying the content item in the content item location and the data for displaying the video element in the content item location and proximate to the content item to a client device, the data including a video still of the video that is displayed in the first portion of the video element;
   receiving data indicating a selection of the playback control of the video element; and
   in response to receiving the data indicating the selection of the playback control of the video element, providing to the client device data for displaying the video in the first portion of the video element in the content item location, wherein the video aspect ratio is maintained when the video is displayed.

2. The method of claim 1, further comprising:
   adjusting the content item to have a first dimension equal to the first dimension of the content item location and a second dimension equal to a second dimension of the content item location to fit the content item location.

3. The method of claim 1, wherein the video aspect ratio is one of 5:4 or 9:16.

4. The method of claim 1, wherein the content item is an image.

5. The method of claim 1, wherein the content item location is at least one of a leaderboard format, a banner format, a skyscraper format, or a wide scraper format.

6. The method of claim 1, wherein the video is a video advertisement.

7. The method of claim 2, wherein the content item is an image and adjusting the content item to fit the content item location comprises:
   cropping the image to fit the content item location.

8. The method of claim 2, wherein the content item is an image and adjusting the content item to fit the content item location comprises:
   reducing a size of the image to fit the content item location.

9. A method, comprising:
   receiving an identification of an advertisement block on a content page, wherein the advertisement block is associated with a predetermined size;
   receiving and displaying a content item image associated with an advertisement in the advertisement block, wherein the advertisement is associated with a video, and further wherein;
   the video is defined by a video aspect ratio and is associated with a video element;
   the video element is defined by a video element aspect ratio that is different from the video aspect ratio and has a first dimension that is equal to a first dimension of the video, and a second dimension that is larger than a second dimension of the video;
   the video is displayed in a first portion of the video element, the first portion of the video element being of the first and second dimensions of the video; and
   a playback control for playing the video is displayed in a second portion of the video element that is adjacent to the first portion of the video element, wherein the playback control has a first dimension that is equal to the first dimension of the video element, wherein the second portion of the video element has a second dimension that is equal to a difference of the second dimension of the video and the second dimension of the video element, and wherein the second portion is contiguous to the first portion;

receiving and displaying the video element, proximate to the content item image and in the advertisement block, wherein the advertisement block has a first dimension that is equal to one of the dimensions of the video element such that the aspect ratio of the video element is maintained when the video element is displayed in the advertisement block; and displaying the video in response to receiving a selection playback control of the video element, wherein the video aspect ratio of the video is maintained when the video is displayed.

10. The method of claim 9, wherein receiving and displaying a video element associated with the advertisement in the advertisement block comprises:

displaying the video element in substantially a top portion of the advertisement block.

11. The method of claim 9, wherein receiving and displaying a video element associated with the advertisement in the advertisement block comprises:

displaying the video element in substantially a side portion of the advertisement block.

12. The method of claim 9, wherein the aspect ratio of the video is one of a 5:4 and 9:16.

13. The method of claim 9, where the advertisement block is at least one of a leaderboard format, a banner format, a skyscraper format, or a wide scraper format.

14. A system, comprising:

a data store configured to store a content item and a video associated with the content item; and a content item engine comprising instruction executable by a processing system and stored in a computer readable medium, wherein upon execution the instructions cause the processing system to perform the operations of:

identify a content item location on a content page;

identify a content item and a video associated with the content item to display in the content item location, wherein:

the video is defined by a video aspect ratio and is associated with a video element;

the video element is defined by a video element aspect ratio that is different from the video aspect ratio and has a first dimension that is equal to a first dimension of the video, and a second dimension that is larger than a second dimension of the video;

the video is displayed in a first portion of the video element, the first portion of the video element being of the first and second dimensions of the video; and a playback control for playing the video is displayed in a second portion of the video element that is adjacent to the first portion of the video element, wherein the playback control has a first dimension that is equal to the first dimension of the video element, wherein the second portion of the video element has a second dimension that is equal to a difference of the second dimension of the video and the second dimension of the video element, wherein the second portion is contiguous to the first portion;

generate data for displaying the content item in the content item location;

generate data for displaying the video element in the content item location and proximate to the content item, wherein the content item location has a first dimension that is equal to one of the dimensions of the video element such that the video element aspect ratio is maintained when the video element is displayed in the content item location; and in response to receiving data indicating a selection of the playback control of the video element, generate data for displaying the video in the first portion of the video element in the content item location, wherein the video aspect ratio is maintained when the video is displayed.

15. The system of claim 14, wherein the content engine is further operable to:

adjust the content item to have a first dimension equal to the first dimension of the content item location and a second dimension equal to a second dimension of the content item location to fit the content item location.

16. The system of claim 14, wherein the data for displaying the video is generated in response to receiving data indicating a selection of the video element.

17. The system of claim 14, wherein the video element aspect ratio is one of 5:4 or 9:16.

18. The system of claim 14, wherein the content item is an image.

19. The system of claim 18, wherein the content engine is further operable to:

crop the image to fit the content item location.

20. A system, comprising:

a data store configured to store a content item and a video associated with the content item; and a content item engine comprising instruction executable by a processing system and stored in a computer readable medium, wherein upon execution the instructions cause the processing system to perform the operations of:

receive an identification of an advertisement block on a content page, wherein the advertisement block is associated with a predetermined size;

receive and displaying a content item image associated with an advertisement in the advertisement block, wherein the advertisement is associated with a video, and further wherein:

the video is defined by a video aspect ratio and is associated with a video element;

the video element is defined by a video element aspect ratio that is different from the video aspect ratio and has a first dimension that is equal to a first dimension of the video, and a second dimension that is larger than a second dimension of the video;

the video is displayed in a first portion of the video element, the first portion of the video element being of the first and second dimensions of the video; and a playback control for playing the video is displayed in a second portion of the video element that is adjacent to the first portion of the video element, wherein the playback control has a first dimension that is equal to the first dimension of the video element, and wherein the second portion of the video element has a second dimension that is equal to a difference of the second dimension of the video and the second dimension of the video element, wherein the second portion is contiguous to the first portion;

receive and display the video element proximate to the content item image and in the advertisement block, wherein the advertisement block has a first dimension that is equal to one of the dimensions of the video element such that the aspect ratio of the video element is maintained when the video element is displayed in the advertisement block;

receive a selection of the playback control of the video element and in response display a video in the first portion of the video element in the advertisement block and further wherein a video aspect ratio is maintained when the video is displayed.

21. A system, comprising:

means for receiving an identification of an advertisement block on a content page, wherein the advertisement block is associated with a predetermined size;

means for receiving and displaying a content item image associated with an advertisement in the advertisement block, wherein the advertisement is associated with a video, and further wherein;

the video is defined by a video aspect ratio and is associated with a video element;

the video element is defined by a video element aspect ratio that is different from the video aspect ratio and has a first dimension that is equal to a first dimension of the video, and a second dimension that is larger than a second dimension of the video;

the video is displayed in a first portion of the video element, the first portion of the video element being of the first and second dimensions of the video; and a playback control for playing the video is displayed in a second portion of the video element that is adjacent to the first portion of the video element, wherein the playback control has a first dimension that is equal to the first dimension of the video element, and wherein the second portion of the video element has a second dimension that is equal to a difference of the second dimension of the video and the second dimension of the video element, wherein the second portion is contiguous to the first portion;

means for receiving and displaying the video element, proximate to the content item image, and in the advertisement block, wherein the advertisement block has a first dimension that is equal to one of the dimensions of the video element such that the aspect ratio of the video element is maintained when the video element is displayed in the advertisement block; and means for receiving a selection of the playback control and in response displaying a video in the first portion of the video element in the advertisement block and further wherein a video aspect ratio is maintained when the video is displayed.

22. A computer-implemented method, comprising:

identifying a content item and a video associated with the content item to display in a content item location on a content page, wherein the video is associated with a video element having an aspect ratio that is different from an aspect ratio of the video, the video element having a first portion and a second portion adjacent to each other, the first portion having the same aspect ratio as the video;

providing data for displaying the content item in the content item location;

providing data for displaying the video element proximate to the content item in the content item location, wherein one of the dimensions of the video element is equal to one of the dimensions of the content item location and the aspect ratio of the video is maintained when the video element is displayed in the content item location, the data including a video still of the video that is displayable in the first portion of the video element and a playback control that is displayable in the second portion of the video element, wherein the second portion of the video element has a second dimension that is equal to a difference of the second dimension of the video and the second dimension of the video element, and wherein the second portion is contiguous to the first portion;

receiving data indicating a selection of the playback control of the video element; and in response to receiving the data indicating the selection of the playback control of the video element, providing data for displaying the video in the first portion of the video element in the content item location, wherein the video aspect ratio is maintained when the video is displayed.

23. The method of claim 22, wherein:

the content item location is at least one of a leaderboard format, a banner format, a skyscraper format, or a wide scraper format; and the aspect ratio of the video is one of 5:4 or 9:16.

24. A system, comprising:

a data store configured to store a content item and a video associated with the content item; and a content item engine comprising instruction executable by a processing system and stored in a computer readable medium, wherein upon execution the instructions cause the processing system to perform the operations of:

identifying a content item and a video associated with the content item to display in a content item location on a content page, wherein the video is associated with a video element having an aspect ratio that is different from an aspect ratio of the video, the video element having a first portion and a second portion adjacent to each other, the first portion having the same aspect ratio as the video;

providing data for displaying the content item in the content item location;

providing data for displaying the video element proximate to the content item in the content item location, wherein one of the dimensions of the video element is equal to one of the dimensions of the content item location and the aspect ratio of the video is maintained when the video element is displayed in the content item location, the data including a video still of the video that is displayable in the first portion of the video element and a playback control that is displayable in the second portion of the video element, wherein the second portion of the video element has a second dimension that is equal to a difference of the second dimension of the video and the second dimension of the video element, and wherein the second portion is contiguous to the first portion;

receiving data indicating a selection of the playback control of the video element; and in response to receiving the data indicating the selection of the playback control of the video element, providing data for displaying the video in the first portion of the video element in the content item location, wherein the video aspect ratio is maintained when the video is displayed.

* * * * *

UNITED STATES PATENT AND TRADEMARK OFFICE
CERTIFICATE OF CORRECTION

| | | |
|---|---|---|
| PATENT NO. | : 8,561,106 B1 | Page 1 of 1 |
| APPLICATION NO. | : 11/963180 | |
| DATED | : October 15, 2013 | |
| INVENTOR(S) | : Taylor et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 595 days.

Signed and Sealed this
Thirty-first Day of March, 2015

Michelle K. Lee
*Director of the United States Patent and Trademark Office*